Feb. 8, 1949.  C. J. MALHIOT  2,461,167
CONVEYER AND TRANSFER MECHANISM

Original Filed May 8, 1942  9 Sheets-Sheet 4

Inventor
Clarence J. Malhiot
By Spencer, Marzall, Johnston & Cook
Attys

Feb. 8, 1949.    C. J. MALHIOT    2,461,167
CONVEYER AND TRANSFER MECHANISM
Original Filed May 8, 1942    9 Sheets-Sheet 5

Inventor:
Clarence J. Malhiot
By Spencer, Margall, Johnston & Cook
Attys

Feb. 8, 1949.     C. J. MALHIOT     2,461,167
CONVEYER AND TRANSFER MECHANISM
Original Filed May 8, 1942     9 Sheets-Sheet 6
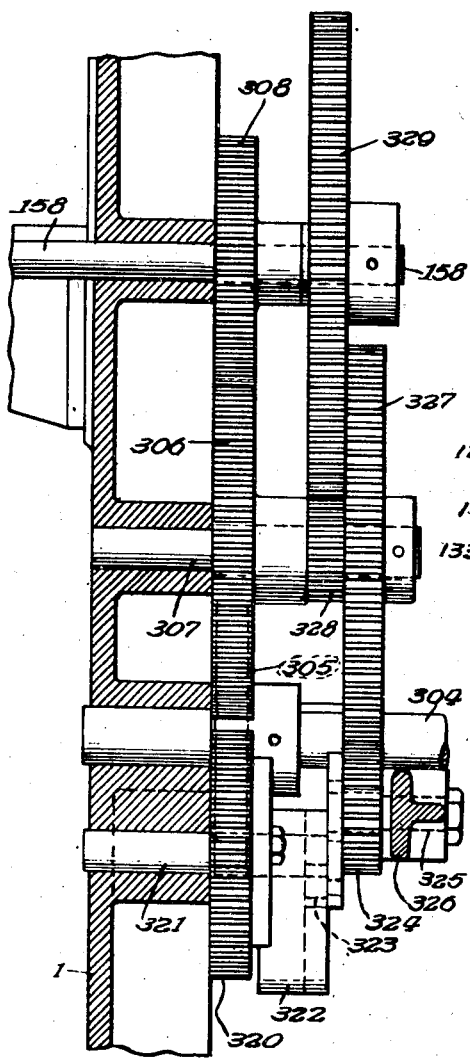
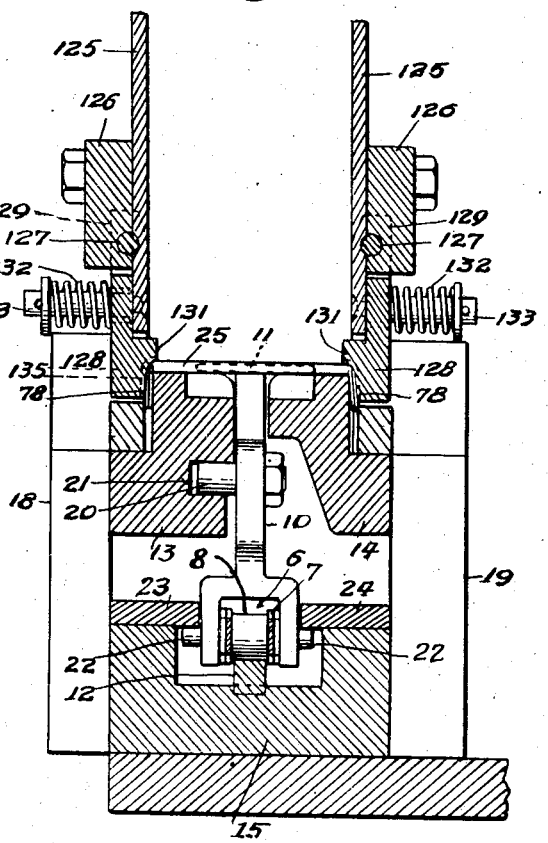
Inventor
Clarence J. Malhiot
By Spencer, Margall, Johnston & Cook
Attys Feb. 8, 1949.                C. J. MALHIOT                2,461,167
                    CONVEYER AND TRANSFER MECHANISM
Original Filed May 8, 1942                        9 Sheets-Sheet 7
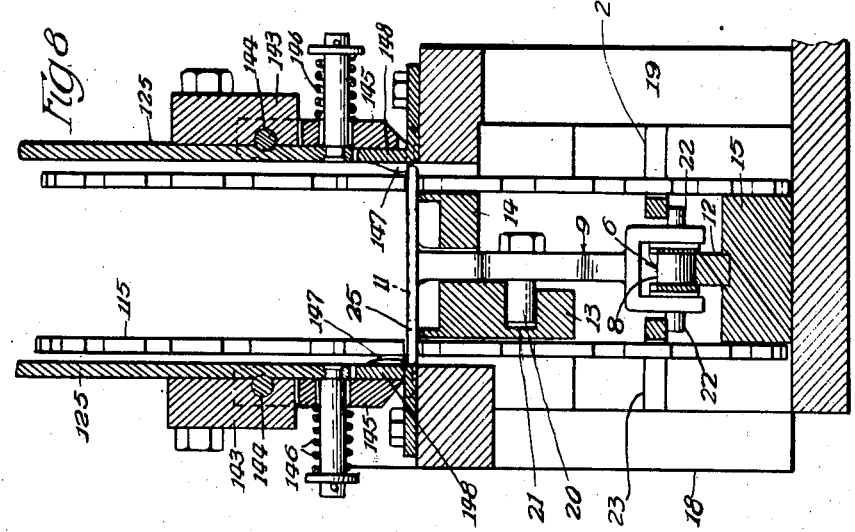
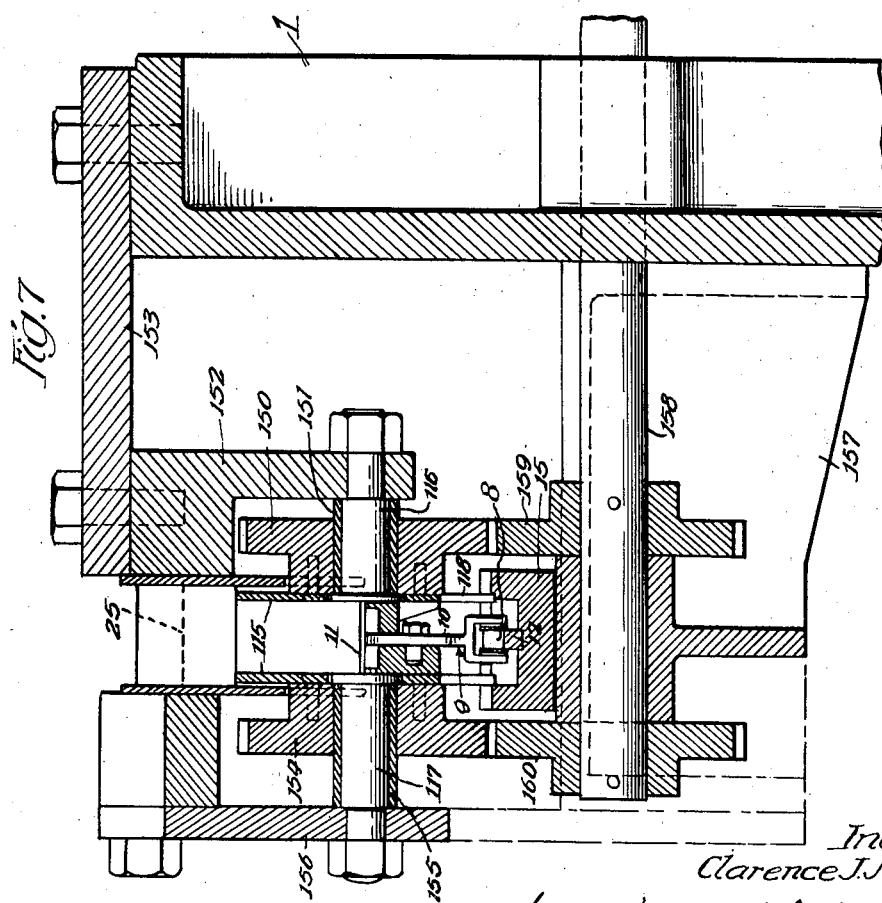
Inventor
Clarence J. Malhiot
By Spencer, Marzall, Johnston & Cook
Attys.

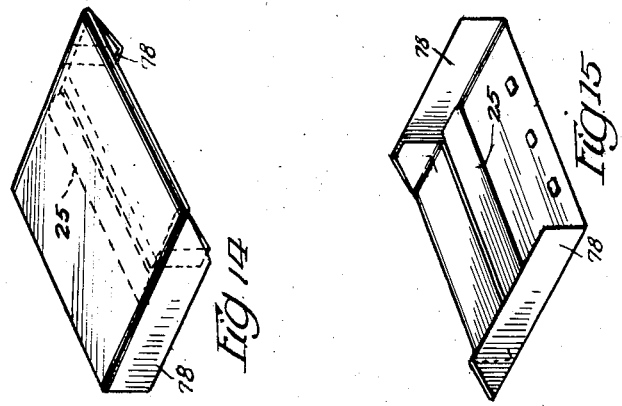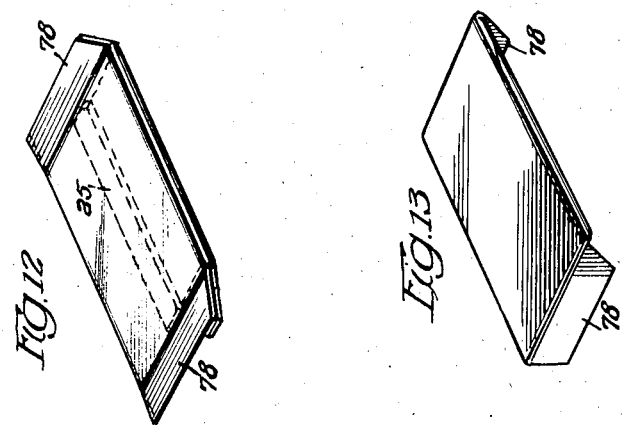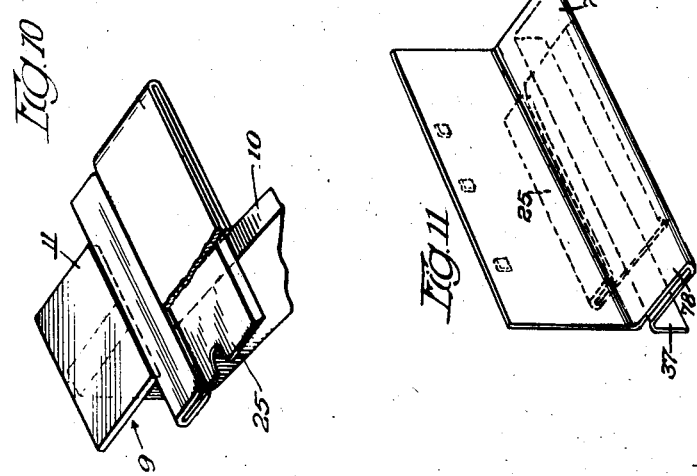

Feb. 8, 1949.   C. J. MALHIOT   2,461,167
CONVEYER AND TRANSFER MECHANISM
Original Filed May 8, 1942   9 Sheets-Sheet 9

Inventor:
Clarence J. Malhiot
By Spencer, Marzall, Johnston & Cook
Atty

Patented Feb. 8, 1949

2,461,167

UNITED STATES PATENT OFFICE 2,461,167

CONVEYER AND TRANSFER MECHANISM

Clarence J. Malhiot, Oak Park, Ill., assignor to F. B. Redington Co, Chicago, Ill., a corporation of Illinois Original application May 8, 1942, Serial No. 442,205. Divided and this application September 9, 1944, Serial No. 553,448

11 Claims. (Cl. 198—33)

This invention relates to conveyor and transfer mechanism for an apparatus for wrapping articles and particularly articles which are relatively small and thin, such as razor blades. This application is a division of my copending application Serial No. 442,205 filed May 8, 1942 and issued as Patent #2,426,314 August 26, 1947.

One of the particular objects of the invention is to provide a new and novel conveyor and transfer mechanism particularly suitable for use in a machine for wrapping articles, such as razor blades, at a constant high speed.

Another object is the provision of a transfer wheel for transferring partially wrapped articles from one position to another, whereby the articles are reversed in position to effect further and additional folding or creasing operations on the wrapper about the article.

Still another object of the invention resides in the provision of a new and improved type of transfer or reversing wheel of a novel construction whereby the articles may be fed continuously and at a rapid rate of speed into the wheel. The said transfer or reversing wheel has pockets particularly designed to receive the articles continuously during continuous rotative movement of the transfer or reversing wheel.

An additional object of the invention is to provide a new and novel conveyor and transfer mechanism particularly adapted for use in a continuous motion wrapping process and apparatus in which an article is completely wrapped and discharged while traveling in substantially a straight line.

A further object is to provide an apparatus for inverting or reversing the article during the wrapping operation, while the partially wrapped article is traveling in substantially a straight line.

A still further object is the provision of a reversing mechanism for inverting an article during continuous forward feed, the mechanism being provided with means for maintaining a partially wrapped article in a predetermined wrapped position during feed into, along and out of the mechanism.

A further object is the provision of a variable speed drive for an article inverting and reversing wheel in a continuous motion wrapping process, the drive being coordinated to the continuous feed of the articles into and out of the wheel, and providing for relatively slow movement of the wheel during such feeding operations.

Another object is the provision of a continuous moving article conveyor which is adapted to feed partially wrapped articles into an inverting or reversing mechanism, and thereafter pick up articles from the inverting mechanism and move the same through further wrapping stations.

These and other objects will be apparent from the following description, the appended claims and the accompanying drawings, which illustrate a selected embodiment of the invention, and in which Fig. 1 is a front elevation of the left-hand portion of a machine constructed in accordance with the present invention;

Fig. 6 is a sectional detail taken on line 6—6 of Figs. 1 and 5;

Fig. 7 is a transverse section taken through the reversing wheel as indicated by the line 7—7 of Fig. 1;

Fig. 8 is a transverse sectional detail taken on line 8—8 of Figs. 1 and 5;

Fig. 9 is a section taken along the line 9—9 of Fig. 3;

Fig. 10 is a perspective view illustrating the manner in which a pusher element engages an article in accordance with the present invention;

Fig. 11 is a perspective view of the article and the wrapper after the wrapper has been applied at the wrapping station;

Fig. 12 is a perspective view of the wrapper with its end flaps rolled down;

Fig. 13 is a perspective view illustrating the wrapper with its end flaps folded down;

Fig. 14 is a perspective view showing the position of the partially wrapped article as it is fed into the reversing wheel of Fig. 5;

Fig. 15 is a perspective view of the partially wrapped article as it is discharged from the reversing wheel;

Like characters of reference indicate the corresponding parts in the different views of this application as well as designating the same parts in the aforesaid co-pending application, Serial No. 442,205.

The particular machine herein shown for the purpose of illustrating the invention includes a vertical main frame 1 which extends longitudinally with respect to the machine and supports the various operating parts thereof.

Article conveying mechanism

Figure 1:
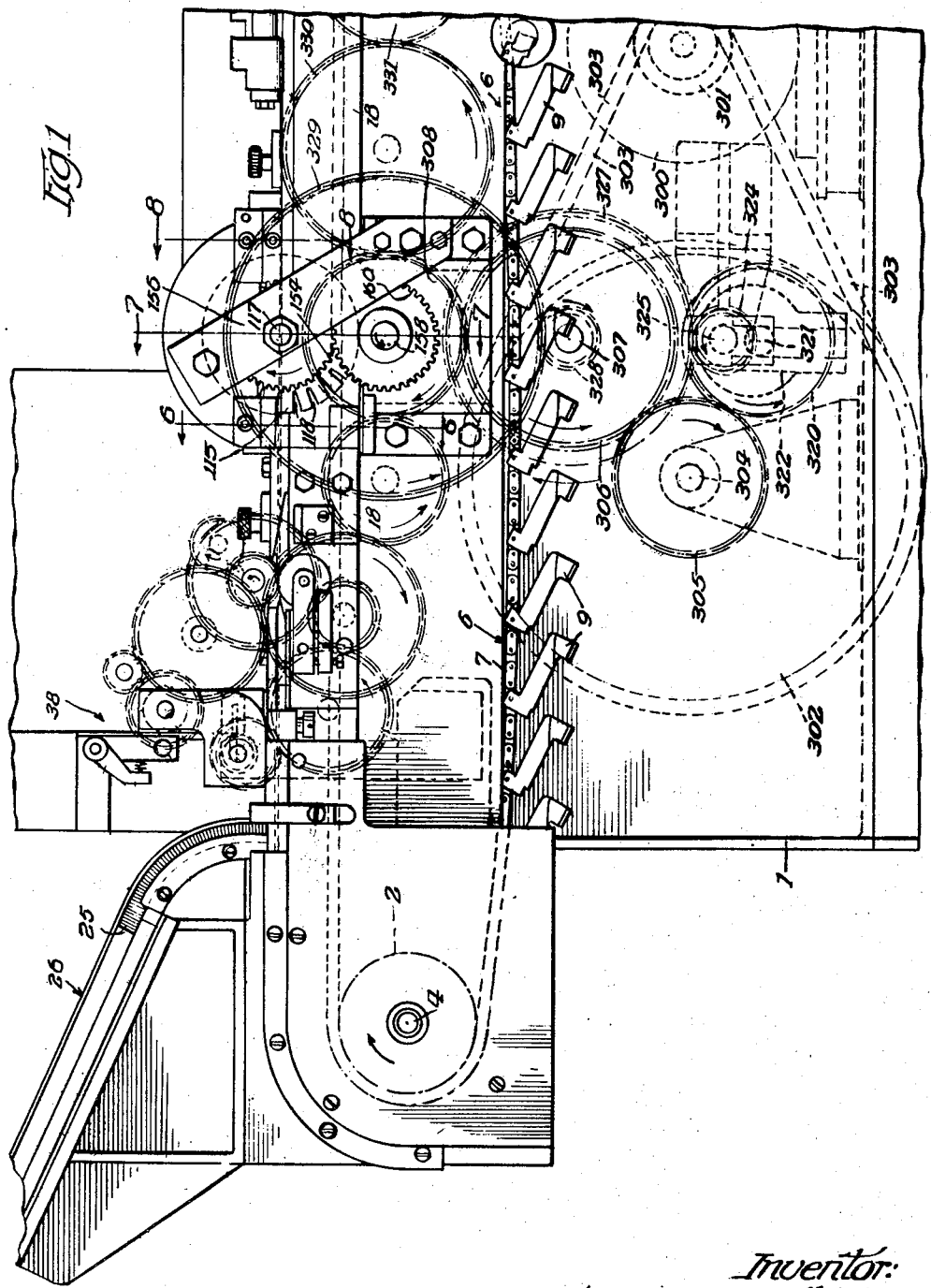
Figure 2:
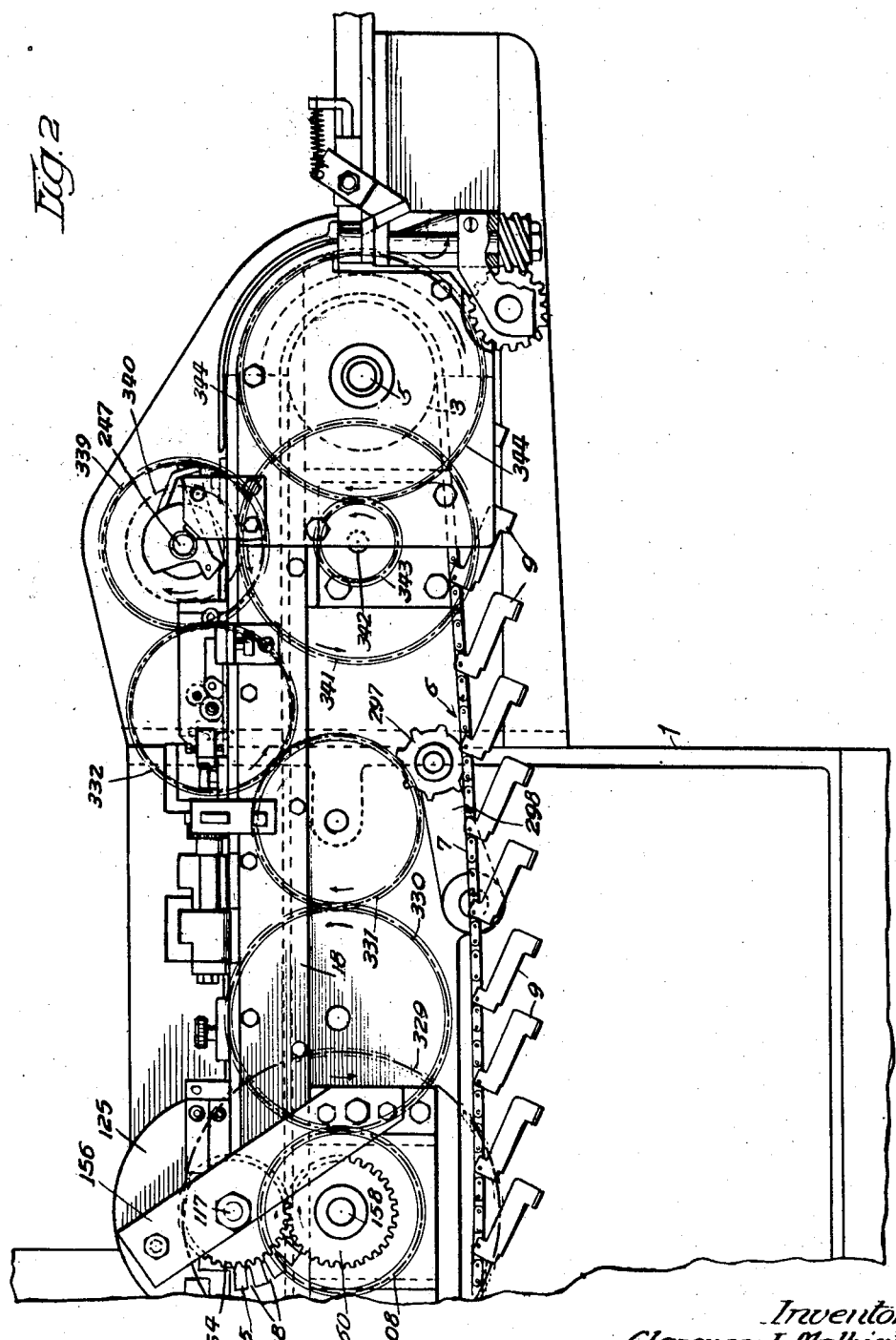
Fig. 2 is a front elevation of the right-hand portion of the machine illustrated in Fig. 1, the two views partially overlapping.

A pair of sprockets 2 and 3 are mounted upon shafts 4 and 5, Figs. 1 and 2, which are suitably supported upon main frame 1, and these sprockets carry a conveyor chain 6. The chain 6, Figs. 1, 5, 6 and 8, comprises a plurality of links 7 pivotally joined together with rollers 8, Fig. 7, therebetween.

Figure 5:
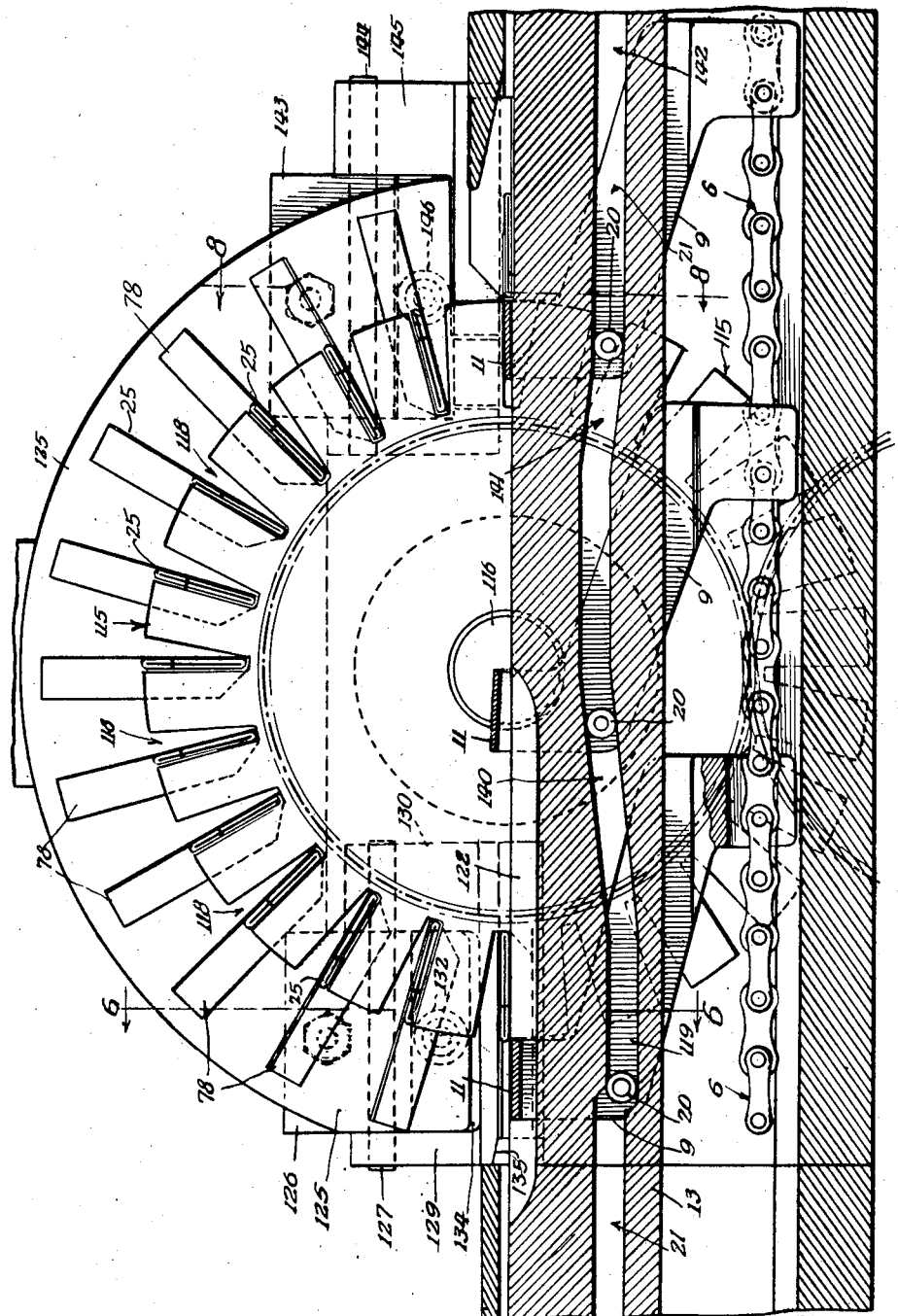
Fig. 5 is a longitudinal section taken on line 5—5 of Fig. 3, and illustrates the wheel for reversing the position of the partially wrapped articles.

A plurality of substantially T-shaped article advancing or pusher members 9 are pivotally connected to the conveyor chain 6. Each of the pusher elements 9 comprises a stem portion 10, Figs. 6 and 7, and a pusher portion 11 (Fig. 5). The pusher elements 9 travel along guide rails 12, 13 and 14 during operative movement. Guide rail 12 is mounted in a substantially U-shaped channel 15 which extends between the upper portions of the sprockets 2 and 3 and is supported at both ends of the machine in any suitable manner. The rollers 8 of the conveyor chain are adapted to travel along the upper surface of the guide rail 12 and to be guided thereby.

The guide rails 13 and 14 are suitably attached to side plates 18 and 19 which extend throughout the length of the machine. The guide rails 13 and 14 provide a table for supporting the article, such as a razor blade, to be wrapped, and also as a guide for the upper portions 11 of the pusher members 9. These guide rails extend from a position adjacent the lower end of the left-hand sprocket 2, to a position adjacent the lower end of the sprocket 3, Fig. 8.

Each of the pusher members 9 is also provided with a pin 20 which is adapted to ride within a cam groove 21 provided in the guide rail 13. The cam groove 21 extends throughout the length of the guide rail 13 and provides for constantly controlling the pusher elements during the operative portion of their movement. A pivot pin 22 also extends outwardly from the pusher members 9 and is received beneath a pair of guide plates 23 and 24 mounted upon the channel member 15. The guide rails 12, 13 and 14 together with the pins 20 and 22, the cam groove 21, and the guide plates 23 and 24 provide for maintaining the pusher members always in proper position, Figs. 6 to 8.

The lower reach of the conveyor 6 is the return for the conveyor mechanism. During the return travel of the conveyor 6 the pushers 9 are allowed to drop to a free position as shown in Figs. 1 and 2. The downward drop of the pushers is limited by the engagement of each pusher element with the links of the conveyor chain. At the left-hand end of the machine the pins 20 of the pushers re-enter the cam groove 21 so that the pusher elements may again co-act with the articles being conveyed. Proper tension in the conveyor chain 6 is maintained by a sprocket 297 carried by a pivotally mounted arm 298, Fig. 2.

Preliminary stations

Figure 3:
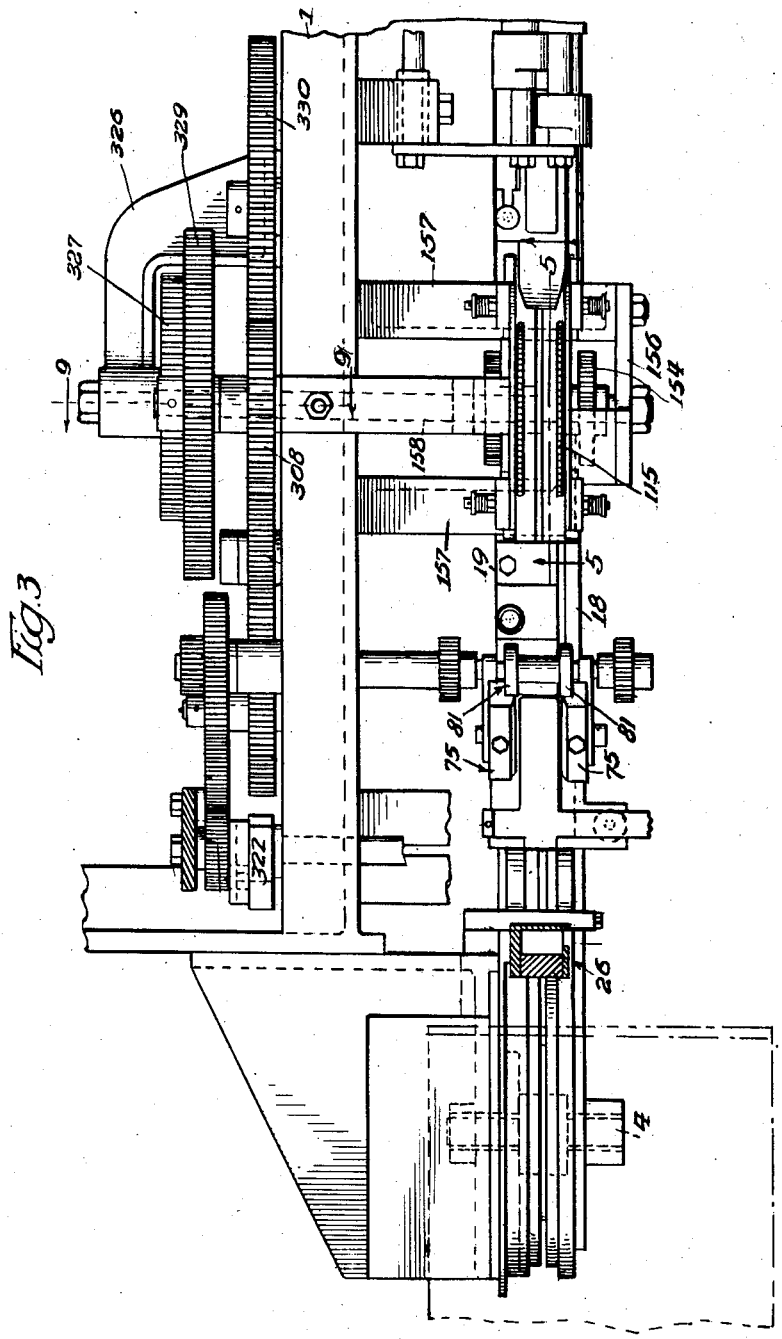
Fig. 3 is a plan view of the apparatus shown in Fig. 1, certain parts being omitted for clarity.

The articles 25 are fed to the guide rails 13 and 14, Fig. 1, and to the conveyor 6 by means of a magazine 26. After being fed to the guide rails, the article 25 is advanced by the pusher 9 to a wrapper feed station 38 where the wrapper is fed to the article 25 and is cut to proper length, whereupon the article is partially wrapped as is shown in Fig. 11. After leaving the wrapping station, the article is carried by the conveyor to an end flap tucking and rolling station 75 and 81, Fig. 3, which tucks and rolls the end flaps of the wrapper so that the partially wrapped article appears as is shown in Fig. 12. The following station is a partial folding station for the end flaps and there the end flaps are folded downwardly 90° as appears in Fig. 13. The mechanism for performing these various partial wrapping operations is not described in this application for the reason that it is not a subject of the protection claimed under this application and it is more fully disclosed and described in my above mentioned co-pending application, Serial No. 442,205.

Article reversing wheel

The continuously advancing article is next received by a reversing wheel which unfolds the partially wrapped article from the position shown in Fig. 14 to that shown in Fig. 15 while continuously advancing the article forwardly along a straight line. This reversing wheel comprises a pair of circular spiders 115, Figs. 5 and 7, so spaced as to receive the articles therein and yet permit passage of the pusher heads 11 therebetween as illustrated in Fig. 7. The spiders 115 are mounted upon shafts 116 and 117 and are rotated as a unit as hereinafter described.

Each of the spiders 115 is provided with a plurality of article receiving pockets or notches 118, Figs. 1, 2 and 5, so spaced as to receive continuously advancing articles during continuous rotary movement of the reversing wheel. The articles are moved into the reversing wheel by the pushers 9 of the conveyor 6, and are picked up on the other side of the wheel by pushers 9 carried by the same conveyor 6. Figs. 5, 16, 17 and 18 illustrate the operation of the conveyor in feeding the article to the reversing wheel.

Figure 16:
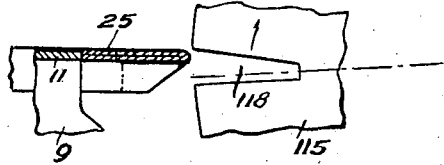
Figs. 16, 17 and 18 are detail views illustrating the manner in which the article is inserted in the reversing wheel of Fig. 5.
Figure 17:
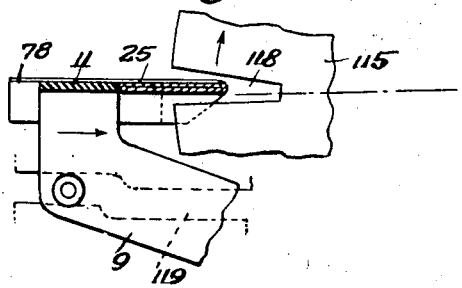

Referring to these figures it will be noted that the article receiving notches 118 are somewhat wider than the thickness of the article. As the article is advanced by the pusher 9 and pusher head 11, the timing is such that an upper portion of a notch 118 of the reversing wheel is in position to receive the article as shown in Fig. 16. Further continuous movement of the wheel and pusher causes the article to be inserted into the notch 118 as indicated in Fig. 17. Just prior to the complete insertion of the article in a notch 118 the pusher 9, including the head 11, is caused to drop by a lowered portion 119 of the cam groove 21 in the guide rail 13. This releases the pusher from the article and permits the pusher to continuously move forwardly while the article is rotatably carried by the reversing wheel, Fig. 5.

The position of the drop in the cam track 21 is such that the pusher head 11 disengages the article at the critical point with respect to movement of the article by the reversing wheel. Since the pin 20 of the pusher which travels in the cam track 21 is cylindrical, the pusher head 11 gradually moves downwardly from the article as the pin 20 engages the drop in the cam track, and then suddenly drops to disengage the head 11 from the article. Guide rails 13 and 14 are suitably grooved as indicated at 122, Fig. 5, to permit the downward movement of the pusher head 11.

During movement of the article around the reversing wheel, the wrapper side flaps 78 are maintained in their folded condition by means of a pair of side plates 125, Figs. 5 and 6, which engage the folded flaps and hold them adjacent the sides of the spiders 115.

A means is also provided to assure that the end flaps 78 remain sharply folded about the ends of the article during initial engagement of the article by the reversing wheel. A plate 126, Figs. 5 and 6, is bolted to each of the members 125 and supports a spindle 127 on each of which a plate member 128 is pivotally mounted by means of forked arms 129 and 130. The plates 128 are provided with outwardly projecting lips 131 which are adapted to engage over the end edges of the article 25 and maintain the end flaps 78 tightly folded about the end edges of the article.

Springs 132 are compressed between the plates 128 and the plates 125, and pins 133 carried by the plate members 125, Fig. 6, urge the plates 128 toward the end edges of the article. As the article moves upwardly, however, under action of the reversing wheel, the plates 128 are adapted to swing outwardly about the pivots 127 to permit upward movement of the article. During this action the lips 131 under action of the springs 132 continue to press against the downwardly folded end flaps of the wrapper and hold these flaps in tightly folded condition until engagement thereof by the plate members 125.

Inward movement of the plate 128 by springs 132 during reception of the article is limited by the plate members 125 which engage against a cut-out portion 134, Fig. 5, of the plate members. The lips 131 are also preferably flared as indicated at 135, Figs. 5 and 6, to provide for ready reception of the wrapper flaps 78 within the lips.

As above described, the inverted articles are again picked up at the opposite side of the reversing wheel by the conveyor 6. Since the reversing wheel is continuously rotating, it is necessary that the pusher heads 11 of the conveyor also move downwardly with the wheel during discharge of the articles from the pockets 118. For this purpose the cam track 21 for guiding the pins 20 is inclined upwardly and then inclined downwardly as indicated at 140 and 141 respectively in Fig. 5. The cam track then continues substantially in the plane of the track 21, as indicated by 142 in Figs. 5, 19, 20 and 21.

Figure 19:
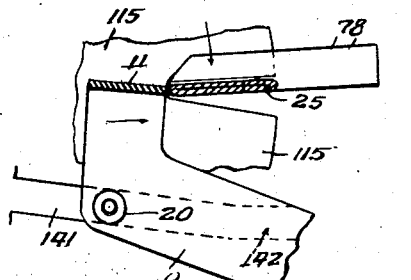
Figs. 19, 20 and 21 are detail views illustrating the manner in which the article is discharged from the reversing wheel.
Figure 20:
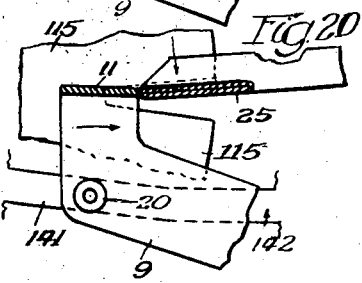
Figure 18:
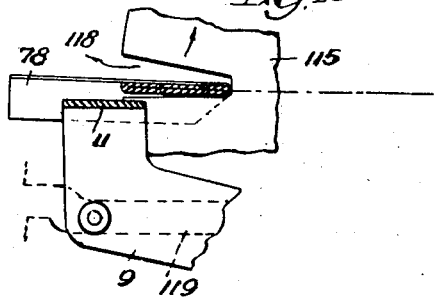
Figure 21:
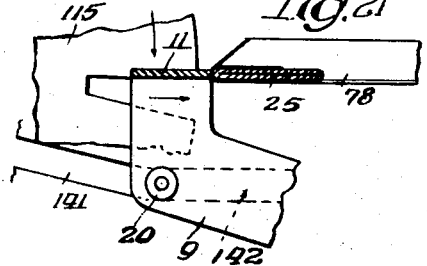

Figs. 19, 20 and 21 illustrate the discharge operation of the articles from the reversing wheel. Fig. 19 shows the pusher head 11 just about to engage an article 25 during downward travel of the pusher on the inclined portion 141 of the cam track. Fig. 20 shows the article 25 partially removed from the reversing wheel during continued downward movement of the pin 20 in the cam track 141. In Fig. 21 the article has been entirely removed from the reversing wheel 115 and the pusher 11 has advanced beyond the wheel while the pin 20 is engaged in the straight cam portion 142.

During discharge of the article from the reversing wheel the end flaps 78, which are now turned upwardly, are clamped at their folds by a clamping mechanism generally similar to that at the feeding end of the reversing wheel. Thus, plates 143, Figs. 5 and 8, bolted to the side plates 125, support pivot pins 144 which pivotally carry plates 145 spring pressed by springs 146. Each of the plates 145 is provided with an inwardly extending lip 147 which is adapted to engage around the end edges of the article during discharge and maintain the wrapper tightly folded therearound. The end flaps are engaged by angle members 148 which maintain the end flaps in proper folded condition and prevent shifting of the package left to right as viewed in Fig. 8, during the discharge operation.

Figure 4:
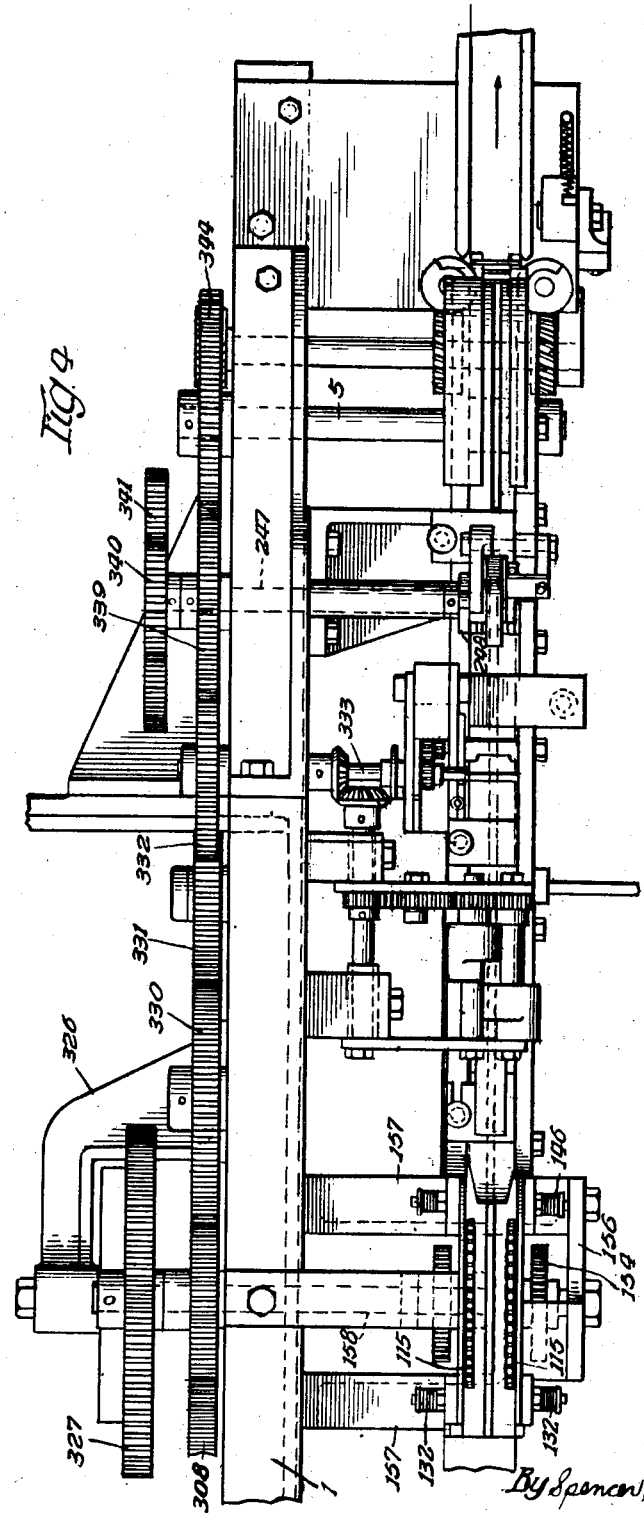
Fig. 4 is a plan view of the apparatus shown in Fig. 2.

The right hand spider 115 of the reversing wheel, Fig. 7, is screwed to a gear 150 mounted on a sleeve 151 carried by the shaft 116 which supports this spider member. The shaft 116 is carried by a bracket 152 attached to an overhanging bracket 153 bolted to the main frame 1. The left hand spider member 115, Fig. 7, is screwed to a gear 154 rotatably mounted on a bushing 155 carried by the shaft 117. The shaft 117 is mounted in an inclined bracket 156, Figs. 1, 2 and 7, bolted to a U-shaped bracket 157 extending from the main frame 1, Figs. 3, 4 and 7.

A shaft 158 extends between the legs of the U-shaped bracket 157 and is suitably supported by the bracket and the main frame 1. The shaft 158 carries gears 159 and 160 which mesh with the gears 150 and 154. Thus, as the shaft 158 is rotated, the two spider members 115 are rotated in unison. The shaft 158 is adapted to be driven continuously but at a variable speed as hereinafter described, the drive being so coordinated with the movement of the conveyor 6 that the pockets 118 travel at a relatively slow speed during insertion of an article therein and travel at a more rapid speed between insertion of the articles.

Subsequent stations

The article with the flap 78 extending upwardly is next passed through the several stations which complete the wrapping of the articles. The subsequent stations also are not described in this application for the reason that they form no part of the invention claimed herein and they are fully described in my above mentioned copending application, Serial No. 442,205.

Machine drive

The entire wrapping machine is driven from a common source of power such as a motor 300, Fig. 1, the various operating parts being so coordinated that the entire machine is driven in proper timed relationship. The motor 300 drives a pulley 301 which is connected to another pulley 302 by means of a belt drive 303. The pulley 302 is mounted upon the main drive shaft of the machine 304, Fig. 1.

A gear 305 is mounted upon and driven by the main drive shaft 304 and meshes with a gear 306 loosely mounted upon a shaft 307. The gear 306 meshes with a gear 308 loosely mounted upon the shaft 158 of the drive mechanism for the reversing wheel. Gear 308 in turn meshes with an idler gear 330 which meshes with a gear 331. Gear 331 meshes with a gear 332 which is mounted upon a shaft 333, Fig. 4. The gear 332 meshes with a gear 339 mounted upon a shaft 247. The shaft 247 carries a pinion 340 which meshes with a gear 341 rotatably mounted upon a shaft 342 which is located beneath the shaft 247. A pinion 343 is attached to the gear 341 and engages a gear 344 which is secured to the shaft 5 of the right hand sprocket wheel 3 and provides for driving the rotary conveyor chain 6, Figs. 2 and 4.

The gear 305 on the main drive shaft 304 also meshes with a gear 320 rotatably mounted on a shaft 321, Fig. 9. The gear 320 provides the power for rotating the reversing wheel 115 and it is driven at a variable speed so that the speed of the reversing wheel 115 varies as is above described. For this purpose the gear 320 carries a channel member 322 within which there is received a roller 323 mounted upon a gear 324. The gear 324 is mounted upon a shaft 325 which is eccentrically positioned with respect to the shaft 321 and is carried by a bracket 326, Figs. 3, 4 and 9. The gear 324 meshes with a gear 327 which rotates a pinion 328 meshing with a gear 329 attached to the shaft 158 of the reversing wheel.

Since both the rotary conveyor chain 6 and the article reversing wheel are positively gear driven from the main drive shaft 304 of the wrapping machine, there is always maintained the proper timed relation between the conveyor chain and the article reversing wheel.

Operation

The conveyor chain 6 is continuously moved by the sprocket 3 thereby continuously advancing the pushers 9 and their pusher heads 11. The feeding chute 26 feeds the articles to be advanced to the guide rails 13 and 14 along which the pusher heads travel. Thereafter the pushers 9 feed the articles into their wrappers 37 at the wrapping station 38 and subsequently the partially wrapped articles are passed along to an end flap tucking and rolling station where the end flaps are tucked and rolled. The tucked end flaps are then folded downwardly and the partially wrapped article is next inverted by the reversing wheel comprising the spider members 115. Following inversion the articles are again picked up by the conveyor 6 and the subsequent wrapping operations are thereafter performed upon the article.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a wrapping machine, a rotary transfer wheel comprising a pair of spaced apart discs having circumferentially spaced pocket forming slots, means to turn said discs continuously and in unison with said slots in lateral alignment, a continuously operating conveyor extending between said discs and movable in a direction to deliver articles successively into the said pockets on one side of said transfer wheel as the same turns continuously, and means to eject articles from said pockets on the other side of the wheel.

2. In a wrapping machine, a rotary transfer wheel comprising a pair of spaced apart discs having circumferentially spaced pocket forming slots, means to continuously turn said discs with said slots in lateral alignment, a continuously operating conveyor extending between said discs and movable in a direction to deliver articles into the said pockets on one side of said transfer wheel to eject articles from said pockets on the other side of the wheel, while the said wheel is in continuous rotation.

3. In a wrapping machine, a rotary transfer wheel comprising a pair of spaced apart discs having circumferentially spaced pocket forming slots, means to turn said discs with said slots in lateral alignment, a conveyor extending between said discs and movable in a direction to deliver articles into the said pockets on one side of said transfer wheel, said conveyor having spaced pusher members thereon, and means to guide said pusher members as the conveyor passes between said discs whereby to retract the same from article pushing position, as the article is delivered in a said pocket, on one side of said wheel, and to project said pusher members into pushing position, on the other side of the wheel, whereby to eject articles from said pockets on the other side of the wheel, while the same is in continuous rotation.

4. In a wrapping machine, a rotary transfer wheel comprising a pair of spaced apart discs having circumferentially spaced pocket forming slots, means to turn said discs with said slots in lateral alignment, a conveyor extending between said discs and movable in a direction to deliver articles into the said pockets on one side of said transfer wheel, said conveyor having spaced pusher members thereon, and means to guide said pusher members as the conveyor passes between said discs whereby to retract the same from article pushing position, as an article is delivered in a said pocket on one side of said wheel, and to project said pusher members into pushing position, on the other side of the wheel, whereby to eject articles from said pockets on the other side of the wheel, while the same is in continuous rotation, and means to reduce the speed of said wheel intermittently whenever the conveyor delivers an article into a said pocket.

5. In a wrapping machine, a rotary transfer wheel comprising a pair of spaced apart discs having circumferentially spaced pocket forming slots, means to turn said discs with said slots in lateral alignment, a conveyor extending between said discs and movable in a direction to deliver articles into the said pockets on one side of said transfer wheel, pusher members spaced apart on said conveyor and successively movable therewith between said discs, said pusher members being retractable on the conveyor from article pushing position, a cam track for guiding the pushers during the movement thereof, from one side of the wheel to the other, and operable to retract each pusher as it delivers an article into the said pocket and to project said pushers into article pushing position whereby to eject articles from said pockets on the other side of the wheel, while the same is in continuous rotation.

6. In a wrapping machine, a rotary transfer wheel comprising a pair of spaced apart discs having circumferentially spaced pocket forming slots, means to turn said discs with said slots in lateral alignment, a conveyor extending between said discs and movable in a direction to deliver articles into the said pockets on one side of said transfer wheel, said conveyor having spaced pusher members pivoted thereon, and means to guide said pusher members as the conveyor passes between said discs whereby to retract the same from article pushing position, as an article is delivered in a said pocket on one side of said wheel, and to project said pusher members into pushing position, on the other side of the wheel, whereby to eject articles from said pockets on the other side of the wheel, while the same is in continuous rotation.

7. In a wrapping machine, a continuously moving article conveyor, a continuously rotating transfer wheel having circumferentially spaced article receiving pockets adapted to receive articles from the conveyor on one side of said wheel, to invert the articles and return the same to said conveyor on the other side of the wheel, said conveyor having spaced pusher members thereon adapted to engage articles and deliver them successively in the pockets of the wheel, a cam track in position to cooperate with said pusher elements as they reach the wheel to retract the same from article engaging position as the article pushed thereby enters a corresponding wheel pocket, on one side of the wheel, said cam track serving to return said pusher members to article engaging position as the same reach the other side of the wheel whereby to eject articles in inverted position from said pockets at the other side of the wheel.

8. In a wrapping machine, laterally spaced rotatable article supports having circumferentially spaced pockets forming slots, means for continuously rotating said supports in unison, a continuously operating conveyor extending between said supports, and movable in a direction to deliver articles successively into said pockets on one side of said supports, and to eject articles from said pockets on the other side of the supports, and means for driving said supports at variable speeds, whereby said supports will be driven at a relatively slow speed during delivery of articles into said pockets.

9. In a wrapping machine, laterally spaced rotatable article supports having circumferentially spaced pockets forming slots, means for continuously rotating said supports in unison, a continuously operating conveyor extending between said supports, and movable in a direction to deliver articles successively into said pockets on one side of said supports, and to eject articles from said pockets on the other side of the supports, means for driving said supports at variable speed, whereby said supports will be driven at a relatively slow speed during delivery of articles into said pockets, said conveyor embodying article engaging and moving elements shiftably mounted with respect to the conveyor, means for moving said elements with respect to the conveyor, and out of engagement with the articles as they are fed from the conveyor to the said supports, and means for returning said elements with respect to the conveyor, and into engagement with articles to discharge them from said supports.

10. In a wrapping machine, laterally spaced rotatable article supports having spaced pockets for receiving the articles, means for continuously rotating said supports, a continuously operating conveyor extending between said supports, and movable in a direction to deliver articles successively into said pockets on one side of the supports, and to eject articles from the pockets on the other side of the supports, and means whereby said supports may be rotated at variable speeds with respect to the speed of the conveyor, while the speed of operation of the conveyor remains constant.

11. In a wrapping machine, laterally spaced rotatable article supports having circumferentially spaced pockets forming slots, means for continuously rotating said supports in unison, a continuously operating conveyor extending between said supports, and movable in a direction to deliver articles successively into said pockets on one side of said supports, and to eject articles from said pockets on the other side of the supports, means for driving said supports at variable speeds, whereby said supports will be driven at a relatively slow speed during delivery of articles into said pockets, said conveyor embodying article engaging and moving elements carried by and shiftably mounted with respect to the conveyor, and means separate from and arranged along the line of travel of the conveyor, for moving said elements with respect to the conveyor and out of engagement with articles as they are fed from the conveyor to the said supports, and for returning said elements with respect to the conveyor into engagement with articles to discharge them from said supports.

CLARENCE J. MALHIOT.

REFERENCES CITED

The following references are of record in the file of this patent:

UNITED STATES PATENTS

| Number | Name | Date |
|---|---|---|
| 1,126,719 | Dearborn | Feb. 2, 1915 |
| 1,481,207 | Johnson | Jan. 15, 1924 |
| 1,567,153 | Kelly | Dec. 29, 1925 |
| 1,572,256 | Van Buren | Feb. 9, 1926 |
| 1,572,257 | Van Buren | Feb. 9, 1926 |
| 1,979,207 | Milmoe | Oct. 30, 1934 |